(12) United States Patent
Okamura et al.

(10) Patent No.: US 8,877,335 B2
(45) Date of Patent: Nov. 4, 2014

(54) CORROSION-RESISTANT MEMBER AND METHOD OF MANUFACTURING THE SAME

(75) Inventors: Masato Okamura, Yokohama (JP); Osamu Shibasaki, Yokohama (JP); Seiji Yamamoto, Tokyo (JP); Toyoaki Miyazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 242 days.

(21) Appl. No.: 13/260,925

(22) PCT Filed: Mar. 26, 2010

(86) PCT No.: PCT/JP2010/055433
§ 371 (c)(1),
(2), (4) Date: Sep. 29, 2011

(87) PCT Pub. No.: WO2010/003814
PCT Pub. Date: Oct. 7, 2010

(65) Prior Publication Data
US 2012/0028038 A1    Feb. 2, 2012

(30) Foreign Application Priority Data

Mar. 30, 2009    (JP) ................................. 2009-082345

(51) Int. Cl.
| | | |
|---|---|---|
| *B32B 3/00* | (2006.01) | |
| *B32B 15/04* | (2006.01) | |
| *C23C 14/08* | (2006.01) | |
| *C09D 5/08* | (2006.01) | |
| *C23F 15/00* | (2006.01) | |
| *C23C 26/00* | (2006.01) | |

(52) U.S. Cl.
CPC ................ *C09D 5/084* (2013.01); *C23F 15/00* (2013.01); *C23C 26/00* (2013.01)

USPC .......................... 428/336; 428/472; 106/14.05

(58) Field of Classification Search
None
See application file for complete search history.

(56) References Cited

U.S. PATENT DOCUMENTS

| | | | | |
|---|---|---|---|---|
| 3,892,897 | A * | 7/1975 | Rittler | 502/309 |
| 4,030,903 | A * | 6/1977 | Rittler | 65/32.4 |
| 7,995,382 | B2 * | 8/2011 | Tsukamoto et al. | 365/163 |
| 8,018,762 | B2 * | 9/2011 | Kubo et al. | 365/163 |

(Continued)

FOREIGN PATENT DOCUMENTS

| | | |
|---|---|---|
| CN | 1694852 A | 11/2005 |
| CN | 101970723 A | 2/2011 |

(Continued)

OTHER PUBLICATIONS

Office Action issued Feb. 17, 2013 in Chinese Patent Application No. 201080015108.8 (with English translation).

(Continued)

*Primary Examiner* — Vera Katz
(74) *Attorney, Agent, or Firm* — Oblon, Spivak, McClelland, Maier & Neustadt, L.L.P.

(57) ABSTRACT

A corrosion-resistant member has a composite titanium oxide film for reducing corrosion deposited on a surface of a construction material, where the composite titanium oxide film is represented by a molecular formula $MTiO_3$ in which M is a transition element, and the corrosion-resistant member is preliminarily manufactured by depositing titanium oxide on the surface of the construction material, and the titanium oxide is subsequently or simultaneously subjected to high temperature treatment under existence of an ion of the transition metal.

5 Claims, 3 Drawing Sheets

(56) References Cited

U.S. PATENT DOCUMENTS

| | | | |
|---|---|---|---|
| 2005/0069464 A1* | 3/2005 | Obee et al. | 422/121 |
| 2006/0146975 A1 | 7/2006 | Okamura et al. | |
| 2010/0142261 A1* | 6/2010 | Kubo et al. | 365/163 |
| 2011/0159279 A1 | 6/2011 | Kobayashi et al. | |

FOREIGN PATENT DOCUMENTS

| | | |
|---|---|---|
| CN | 102137954 A | 7/2011 |
| JP | 04 130017 | 5/1992 |
| JP | 07 101936 | 4/1995 |
| JP | 2000 254518 | 9/2000 |
| JP | 2001 226783 | 8/2001 |
| JP | 2003-232886 | 8/2003 |
| JP | 2004 335043 | 11/2004 |
| JP | 2008 111085 | 5/2008 |

OTHER PUBLICATIONS

International Search Report issued Apr. 20, 2010 in PCT/JP10/055433 filed Mar. 26, 2010.

Korean Office Action issued Aug. 20, 2012, in Korea Patent Application No. 10-2011-7024257.

International Preliminary Report on Patentability and Written Opinion issued Nov. 15, 2011 in patent application No. PCT/JP2010/055433 filed Mar. 26, 2010.

* cited by examiner

CORROSION-RESISTANT MEMBER AND METHOD OF MANUFACTURING THE SAME

TECHNICAL FIELD

The present invention relates to a corrosion-resistant member for protecting, for instance, a material constituting a structure of a plant and also relates to a method of manufacturing the same.

BACKGROUND ART

In a conventional technology, there has been provided a problem to suppress flow-accelerated corrosion such as an elution of ions from and corrosion in a metal that is a structural material, in various plants such as a thermal power plant, a nuclear power plant and a chemical plant, which have a boiler, a steam generator and the like, and which use a high-temperature water of 80° C. or higher and 800° C. or lower. The elution of metal ions is a representative phenomenon occurring in the high-temperature water, which provides problems, for example, of causing various influences in operation, and increasing in frequency of maintenance of the plant due to the corrosion of a pipe and other members including the structural material.

In addition, the eluted metal ion adheres to and deposits on a surface of the pipe in a system, or a high temperature site or a site with which high-temperature water comes in contact, in the steam generator and the like, as an oxide, which may result in a possibility of causing a vibration of equipment and the lowering of a heat transfer coefficient. The vibration under a high flow-velocity condition is a serious problem, and has a possibility of causing a crack or damage in the structural material. Moreover, a recent technology may cause a possibility of decreasing in the thickness of a carbon steel pipe due to a wall-thinning phenomenon in the pipe and a malfunction occurs.

As mentioned above, there is a potential possibility that the elution and corrosion phenomena and the like of the metal are gradually accumulated during a plant operation in a long period of time and a malfunction suddenly occurs at some stage. Furthermore, there is a possibility that a corrosion rate increases according to shape of a structural portion or an unpredictable phenomenon occurs.

For instance, in a piping system in which orifices, valves and the like are much used, there is a possibility of causing erosion-corrosion by a liquid which passes through the inner space at a high speed. On the other hand, in a narrow portion such as a crevice portion between a heat transfer pipe and a supporting plate, there is a possibility of accumulating impurities at a highly concentrated state, and occasionally forming concentrated water having strong acidity or strong alkalinity according to the ion balance. A phenomenon of corrosion cracking is confirmed, which is caused by such a phenomenon and a rise of an electric potential, due to the oxide adhering to the surface. Because of these reasons, various measures including a water quality control have been implemented in various plant systems.

For instance, in the secondary system of the pressurized-water nuclear power plant, such measures are taken as to control pH by injecting ammonia and hydrazine, to decrease the elution of iron from the inside of the system and to prevent the inflow of the iron to the steam generator (Patent Document 1, for example, described hereinbelow).

Furthermore, in order to eliminate alkali concentration in the crevice portion, various water quality controls have been implemented in an actual plant, such as an Na/Cl ratio control, a chloride ion concentration control for decreasing an influence of a chlorine ion on corrosion, and a dissolved oxygen concentration control (Patent Document 2, for example). In recent years, a water-quality control method is also adopted by using improved chemicals such as ethanolamine and morpholine.

In addition to the measures already implemented in an actual plant, such as reductions of the corrosion of pipes, the adhesion and deposition of an oxide, and the concentration of ions in the crevice portion as described above, various technologies have also been proposed as an improved proposal. For example, for the improvement of the chemicals to be injected, there has been proposed a method of using an organic acid such as tannic acid and ascorbic acid as an oxygen scavenger (Patent Document 3).

Furthermore, as for the water-quality control method, there are also proposed an operation method of controlling a molar ratio of all cations/$SO_4$ (Patent Document 4), a method of introducing at least one of a calcium compound and a magnesium compound into feed-water to a steam generator for a reactor so that the ion concentration becomes 0.4 to 0.8 ppb (Patent Document 5).

As mentioned above, the measures of suppressing corrosion elution by a water-quality control technique and the like which uses the chemicals are actually implemented as a measure of preventing the corrosion and elution of a plant structural material. However, it is needed and desired to enhance an availability factor and a reliability of the plant by providing a member of a plant which can be operated without injection of the chemical liquid, from the viewpoint of operation cost and operability,

PRIOR ART DOCUMENTS

Patent Documents

Patent Document 1: Japanese Patent Laid-Open Publication No. 8-122491
Patent Document 2: Japanese Patent Laid-Open Publication No. 2000-310695
Patent Document 3: Japanese Patent No. 2848672
Patent Document 4: Japanese Patent Laid-Open Publication No. 10-293194
Patent Document 5: Japanese Patent Laid-Open Publication No. 2004-12162

DESCRIPTION OF THE INVENTION

Problems to be Solved by the Invention

However, in the present state of technology, many of various plants using high-temperature water are operated in such a state that a chemical agent is injected so as to suppress the flow-accelerated corrosion, and accordingly, it is requested to propose a technology, by which the plant can be operated while suppressing the corrosion and elution, without injecting chemical agent into the plant.

Then, in consideration of the circumstances encountered in the prior art mentioned above, the present invention was conceived and an object thereof is to provide a plant structural member which can suppress flow-accelerated corrosion such as corrosion and elution without injecting any chemical agent into the plant and also to provide a method of manufacturing such plant structural member.

Means for Solving the Problems

In order to achieve the above described object, the present invention provides, in one aspect, a corrosion-resistant member having a composite titanium oxide film which decreases corrosion and is represented by a molecular formula $MTiO_3$ in which M is a transition element, formed on a surface of a construction material that comes in contact with the high-temperature water.

Furthermore, the above described object of the present invention is achieved by providing, in another aspect, a method of manufacturing a corrosion-resistant member which has a composite titanium oxide film for decreasing corrosion formed on a surface of a construction material, wherein the composite titanium oxide film is represented by a molecular formula $MTiO_3$ in which M is a transition element, and wherein titanium oxide is preliminarily deposited on the surface of the construction material, and the titanium oxide is subsequently or simultaneously subjected to high temperature treatment under existence of an ion of the transition metal M.

In an embodiment of the present invention of the characters described above, the high-temperature water may be preferably 80° C. or higher and 800° C. or lower.

In addition, the construction material may be preferably one material selected from steel, a non-steel material, a non-ferrous metal and a welded metal.

In addition, the composite titanium oxide may be a composite titanium oxide of an ilmenite group.

Furthermore, the transition metal M may be preferably one member selected from Fe, Ni, V, Cr, Mn, Co, Cu, Zn, Mo, Ru, Pd and Rh.

Furthermore, the thickness of the composite titanium oxide film may be preferably 0.1 to 50 μm.

Effects of the Invention

According to the present invention of the characters and features mentioned above, there can be provided a structural member which has a composite titanium oxide film that is less likely to exfoliate even when compared to $TiO_2$ which physically deposits on a surface of the plant structural material, because of being complexed and chemically bonded (deposited) to the surface, can suppress the flow-accelerated corrosion which may occur in a portion at which a high-temperature fluid is flowing, and accordingly, can suppress the flow-accelerated corrosion such as corrosion and elution without injecting the chemical agent into itself. The present invention can also provide a method of manufacturing such structural member.

MODE FOR CARRYING OUT THE INVENTION

Hereunder, the corrosion-resistant member according to a first embodiment of the present invention will be described with reference to FIGS. 1 and 2.

Figure 1:
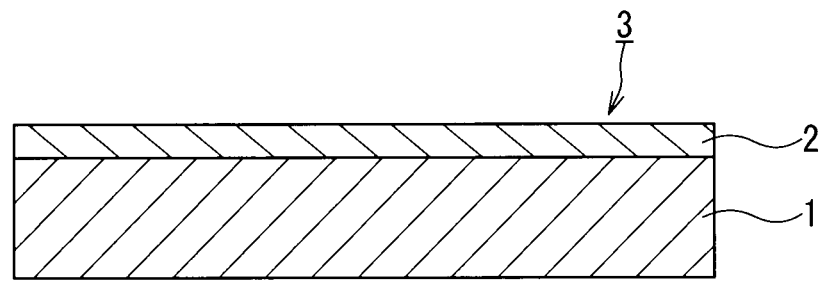
FIG. 1 is a longitudinal sectional view of a corrosion-resistant member according to the present invention.

FIG. 1 illustrates a structure of a corrosion-resistant member 3 which has a film of an ilmenite-type composite titanium oxide 2 that has a crystal structure, for instance, formed from $FeTiO_3$, has an ilmenite form and is a composite titanium oxide, formed (deposited) on a surface of a plant structural material 1, for instance, formed from carbon steel, which is the plant structural material that contacts a high-temperature water of 80° C. or higher and 800° C. or lower.

Figure 2:
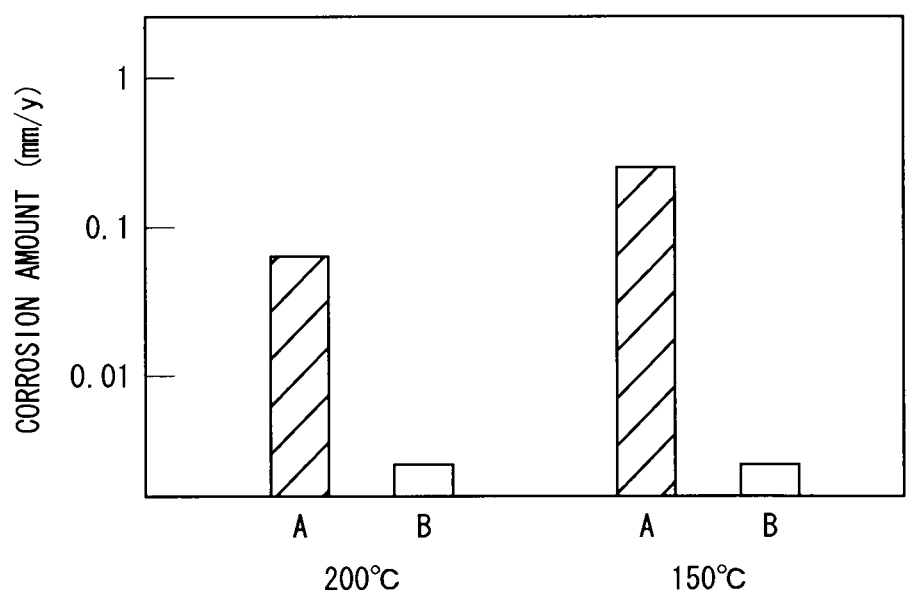
FIG. 2 is a characteristic diagram representing a corrosion-suppressing effect of an $FeTiO_3$ film.

FIG. 2 illustrates a result of a corrosion test which has been conducted under conditions such that the concentration of dissolved oxygen is less than 5 ppb and the flow velocity is 15 m/sec, with the use of a test piece formed of the corrosion-resistant member 3 illustrated in the FIG. 1.

It is understood from FIG. 2 that in the test piece B having the $FeTiO_3$ film formed on a surface of the carbon steel, the corrosion rate under a high flow-velocity condition is suppressed in comparison with the test piece A of only the carbon steel. The corrosion rate of the test piece A of only the carbon steel increased at a test-atmosphere temperature of 150° C. compared with that at the test-atmosphere temperature of 200° C., but the corrosion rate of the test piece B having the $FeTiO_3$ film formed thereon almost did not change.

As was described above, by forming the composite titanium oxide film formed from $FeTiO_3$ and deposited on the surface of the structural material, the composite titanium oxide film is complexed, is chemically bonded to the surface of the plant structural material, and accordingly, is less likely to exfoliate even when compared with $TiO_2$ which physically deposits on the surface. Then, it would be expected that an effect of suppressing corrosion, and especially, an effect of suppressing the wall thinning due to a flow-accelerated corrosion which may occur in a portion at which a high-temperature fluid is flowing appear. It accordingly becomes possible to decrease a malfunction associated with the wall thinning of the pipe and a frequency of periodic inspection.

Incidentally, although in the above described example, $FeTiO_3$ was shown as an example of the composite titanium oxide, $NiTiO_3$ may be also used, for instance, which is represented by a molecular formula $MTiO_3$ where "M" is a transition metal. As other elements than Fe and Ni, the "M" may be a divalent element among transition elements, and for example, V, Cr, Mn, Co, Cu, Zn, Mo, Ru, Pd or Rh may be also used.

In addition, in the above described example, although the carbon steel was shown as an example of a plant structural material, a similar effect will be obtainable by steel material, a non-steel material, a nonferrous metal and a welded metal.

A method for manufacturing a corrosion-resistant member according to a second embodiment of the present invention will be described hereunder with reference to FIG. 3 and FIG. 4.

Figure 3:
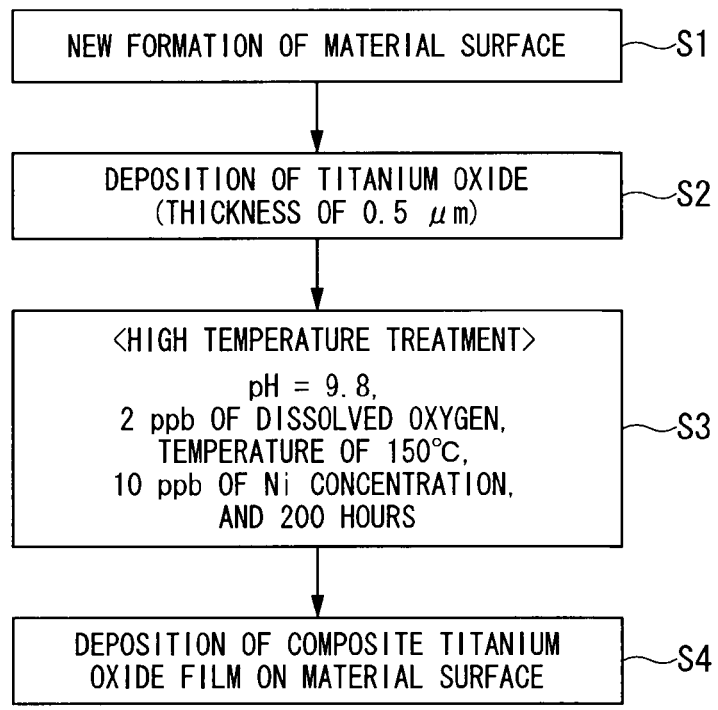
FIG. 3 is a block diagram (i.e., flowchart) showing a process of forming a composite titanium oxide on a surface of carbon steel.

FIG. 3 illustrates a block diagram (i.e., flowchart) of a process of forming a composite titanium oxide on a surface of carbon steel.

In the flowchart of FIG. 3, a surface of the carbon steel is first subjected to polishing or chemical cleaning treatment to thereby expose a newly-formed surface is exposed. (A new surface is formed on the material (Step S1)).

Thereafter, titanium oxide is deposited on the newly-formed surface (Step S2). In this step S2, as for a depositing method, either one of a spray coating method or a depositing method of introducing titanium oxide under the condition of high temperature, and bringing the titanium oxide into contact with the surface of the structural material to thereby deposit the titanium oxide on the surface.

In the next process, a solution is prepared in which the water quality is controlled in a manner such that a pH value is 8 or more and 12 or less and, for instance, is 9.8, the concentration of dissolved oxygen is less than 10 ppb and, for instance, is 2 ppb, the temperature of the aqueous solution is 80° C. or higher and 500° C. or lower and, for instance is 150° C., and the concentration of a transition metal ion is 1 ppb or more and 10% or less and, for instance. Further, when $NiTiO_3$ is formed on the surface as the composite titanium oxide, the concentration of Ni ion is 10 ppb, and the above structural material having titanium oxide deposited thereon is subjected to high temperature treatment (150° C.) in the solution (Step S3).

As a result, the form of titanium oxide having deposited on the surface changes to the form of an ilmenite type of a composite titanium oxide (Step S4).

Figure 4:
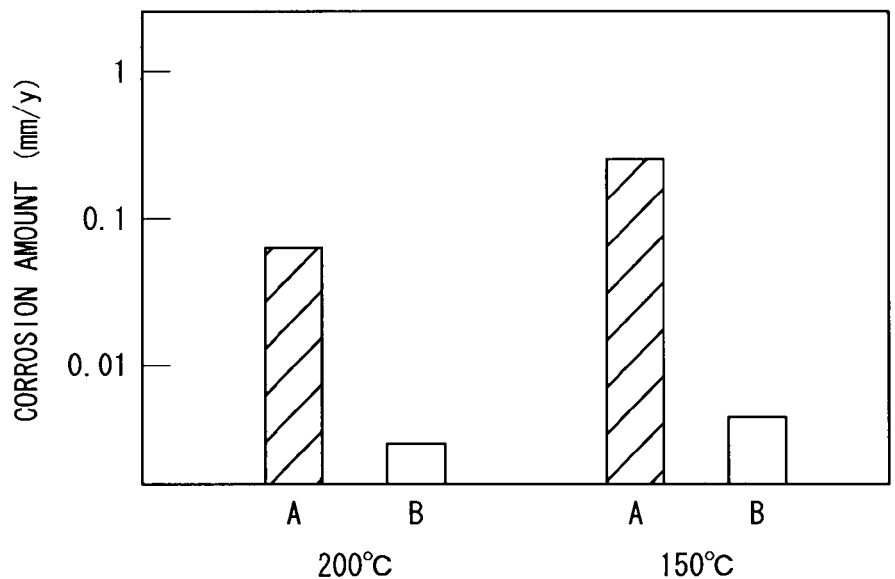
FIG. 4 is a characteristic diagram representing a corrosion-suppressing effect of an $NiTiO_3$ film.

FIG. 4 shows a result of the corrosion test which was conducted by using the test piece mentioned above under the condition in which the concentration of dissolved oxygen was 5 ppb or less, the flow velocity was 15 m/sec, and the temperature was 150° C. and 200° C.

From the result shown in FIG. 4, it is found that the corrosion rate was decreased in the test piece B of the carbon steel having the $NiTiO_3$ film formed thereon compared with the test piece A of only the carbon steel, and that the corrosion-accelerating action under a high flow-velocity condition was suppressed by the formed film.

As described above, by forming the composite titanium oxide film formed from $FeTiO_3$ on the surface of the structural material, it becomes not necessary for the plant to be operated in a state of injecting a chemical agent thereinto. The composite titanium oxide film is complexed and chemically bonded to the surface of the plant structural material. Accordingly, it is less likely to exfoliate even when compared with $TiO_2$ which is physically deposited on the surface. Then, the effect of suppressing corrosion, and especially, the effect of suppressing the wall thinning due to a flow-accelerated corrosion, which may occur in a portion at which a high-temperature fluid is flowing appear, may be expected. Therefore, it becomes possible to decrease a malfunction associated with the wall thinning of the pipe and a frequency of periodic inspection.

Incidentally, in the above described second embodiment, although $NiTiO_3$ was shown as an example of the composite titanium oxide, $FeTiO_3$ also showed the similar tendency. In addition, the metal may be a divalent element other than Fe and Ni among transition elements, for example, as well as V, Cr, Mn, Co, Cu, Zn, Mo, Ru, Pd or Rh.

A method for manufacturing a corrosion-resistant member according to the third embodiment of the present invention will be described hereunder with reference to FIG. 5 and FIG. 6.

Figure 5:
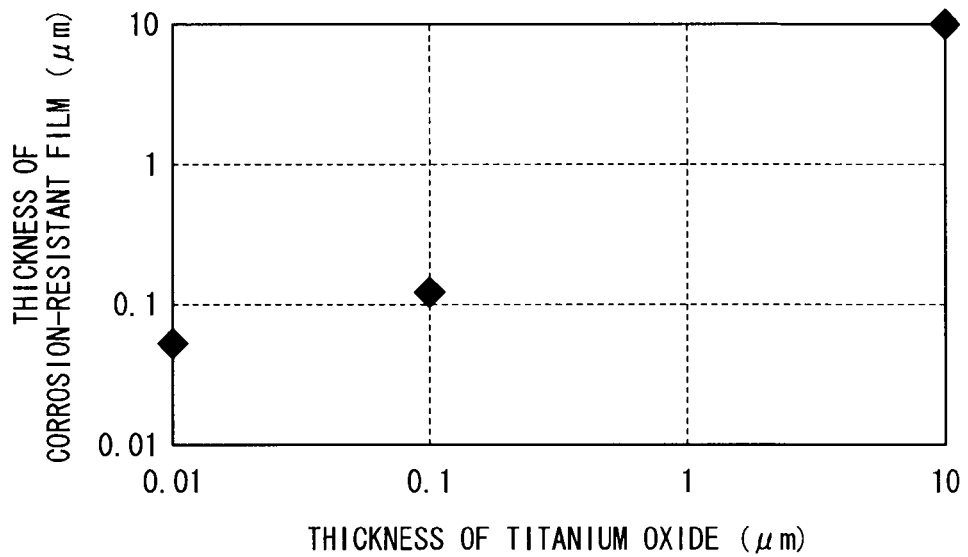
FIG. 5 is a characteristic diagram representing a relation between the thickness of titanium oxide and the thickness of a corrosion-resistant film.

According to the method of FIG. 5, in which $FeTiO_3$ film was formed on the surface of the carbon steel under the same conditions, except that Ni of the transition metal element was changed to Fe. At this time, the amount of titanium oxide deposited in the previous step was changed so that each thickness is controlled to 0.01 μm, 0.1 μm and 10 μm, and the film thickness of $FeTiO_3$ of the corrosion-resistant film was changed. The result is shown in FIG. 5, from which it is understood that the thickness of each corrosion-resistant film becomes 0.05 μm, 0.2 μm and 10 μm according to the change of the amount of the deposited titanium oxide.

Figure 6:
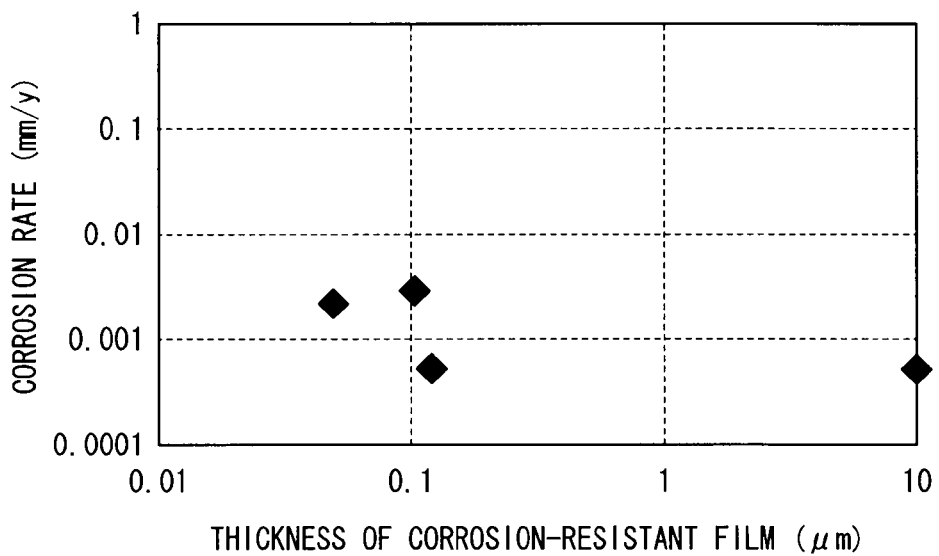
FIG. 6 is a characteristic diagram representing a relation between the thickness of a corrosion-resistant film and a corrosion rate.

FIG. 6 also shows a result of the corrosion test which was conducted by using three types of test pieces on such conditions that the concentration of dissolved oxygen was 5 ppb or less, the flow velocity was 15 m/sec, and the temperature was 150° C. It is understood from the result of FIG. 6 that a corrosion rate does not almost change when the thickness of the corrosion-resistant film becomes thicker than 0.1 μm.

Because of the reason mentioned above, a period of time for the manufacturing process can be shortened by properly controlling the amount of the deposited titanium oxide in the process. In addition, even when the formation of titanium oxide and the high-temperature treatment are simultaneously performed in a similar manner, it was found that the film thickness can be controlled by the amount of the deposited titanium oxide.

Incidentally, in the above described third embodiment, although the $FeTiO_3$ was shown as an example of the composite titanium oxide, the like tendency was observed in the use of the $NiTiO_3$. In addition, such a metal as divalent element other than Fe and Ni among transition elements, for example, V, Cr, Mn, Co, Cu, Zn, Mo, Ru, Pd or Rh, may be used.

The technology of the present invention in the embodiments described above is not limited only to a thermal power plant, a nuclear power plant, a chemical plant and the like, but also can be applied to a conventional boiler and a general structural material which comes in contact with high-temperature water.

The invention claimed is:

1. A corrosion-resistant member having a composite titanium oxide film which decreases corrosion and is represented by a molecular formula $MTiO_3$ in which M is a transition element, formed on a surface of a construction material that comes in contact with high temperature water having a temperature in a range of 80° C. to 800° C., and then chemically bonded to a surface of a construction material of a plant that chemically comes into contact with the high-temperature water,
    wherein titanium oxide is preliminarily deposited on the surface of the construction material, and the titanium oxide is subsequently or simultaneously subjected to high temperature treatment in a presence of an ion of a transition metal.

2. The corrosion-resistant member according to claim 1, wherein the construction material is one material selected from a steel, a non-steel material, a nonferrous metal and a welded metal.

3. The corrosion-resistant member according to claim 1, wherein the composite titanium oxide film is a composite titanium oxide of an ilmenite group.

4. The corrosion-resistant member according to claim 1, wherein the transition element M is one selected from Fe, Ni, V, Cr, Mn, Co, Cu, Zn, Mo, Ru, Pd and Rh.

5. The corrosion-resistant member according to claim 1, wherein the composite titanium oxide film has a thickness of 0.1 to 50 μm.

* * * * *

UNITED STATES PATENT AND TRADEMARK OFFICE
CERTIFICATE OF CORRECTION

| | | |
|---|---|---|
| PATENT NO. | : 8,877,335 B2 | Page 1 of 1 |
| APPLICATION NO. | : 13/260925 | |
| DATED | : November 4, 2014 | |
| INVENTOR(S) | : Masato Okamura et al. | |

It is certified that error appears in the above-identified patent and that said Letters Patent is hereby corrected as shown below:

On the title page, Item (87), the PCT Publication Number is incorrect. Item (87) should read:

--(87)    PCT Pub. No.:    WO2010/113814
           PCT Pub. Date:    Oct. 7, 2010--

Signed and Sealed this
Twenty-fourth Day of February, 2015

Michelle K. Lee
*Deputy Director of the United States Patent and Trademark Office*